United States Patent [19]

Silverberg

[11] 4,381,893
[45] May 3, 1983

[54] RECIRCULATING DOCUMENT LATERAL REGISTRATION

[75] Inventor: Morton Silverberg, Rochester, N.Y.

[73] Assignee: Xerox Corporation, Stamford, Conn.

[21] Appl. No.: 245,555

[22] Filed: Mar. 19, 1981

[51] Int. Cl.$^3$ .................... G03G 15/04; B65H 9/10
[52] U.S. Cl. ..................... 355/3 SH; 271/3.1; 271/98; 271/105; 271/171; 271/241; 271/250
[58] Field of Search ................ 271/3.1, 4, 5, 250, 271/252, 231, 237, 241, 225, 98, 99, 105, 171, 223; 355/3 SH, 75

[56] References Cited

U.S. PATENT DOCUMENTS

| | | | |
|---|---|---|---|
| Re. 27,976 | 4/1974 | Sahley | 355/64 |
| 2,165,172 | 7/1939 | Backhouse | 271/252 |
| 3,476,382 | 11/1969 | Tregay et al. | 271/240 |
| 3,536,320 | 10/1970 | Derby | 271/4 X |
| 3,627,312 | 12/1971 | Fackler et al. | 271/221 |
| 3,630,515 | 12/1971 | Knapp | 271/4 |
| 3,908,986 | 9/1975 | Bleau | 271/227 |
| 3,973,768 | 8/1976 | Shannon | 271/99 |
| 4,049,256 | 9/1977 | Church et al. | 271/9 |
| 4,050,688 | 9/1977 | Stange et al. | 271/5 |
| 4,061,329 | 12/1977 | Sachuk et al. | 271/225 X |
| 4,130,274 | 12/1978 | Stange | 271/236 |
| 4,164,349 | 8/1979 | Marass | 271/250 |
| 4,169,674 | 10/1979 | Russel | 355/14 |
| 4,179,117 | 12/1979 | Rhodes, Jr. | 271/251 |
| 4,188,027 | 2/1980 | Naumann | 271/250 X |
| 4,248,413 | 2/1981 | Fox | 270/53 |
| 4,260,149 | 4/1981 | Melzer | 271/250 X |
| 4,269,406 | 5/1981 | Hamlin | 271/108 |
| 4,270,746 | 6/1981 | Hamlin | 271/98 |
| 4,335,954 | 6/1982 | Phelps | 355/3 SH X |

Primary Examiner—Bruce H. Stoner, Jr.

[57] ABSTRACT

In a system of plurally recirculating a set of document sheets for precollated copying wherein the document sheets are repeatedly individually fed seriatim from the bottom of an overlying stack thereof for copying with registration and returned to the top of the stack for restacking, the improvement comprising individually acquiring, and individually urging laterally into contact with an elongated lateral registration edge, with a movable vacuum member each document sheet when it is the bottom sheet of the stack of document sheets, releasing the bottom sheet, and feeding the bottom sheet out from said stack transverse said lateral registration edge by separate sheet feeding apparatus only after it has been so laterally registered and released. Preferably this individual lateral registration of the bottom sheet in the stack is assisted by simultaneously blowing air at said stack from one edge thereof to aid the movement between the bottom sheet and the overlying sheets in said stack.

2 Claims, 3 Drawing Figures

RECIRCULATING DOCUMENT LATERAL REGISTRATION

The present invention relates to a document handling system and more particularly relates to method and apparatus for individually laterally registering document sheets to be copied, particularly suited for a recirculatory document (precollation copying) system in which documents are fed from the bottom of a stack thereof.

A xerographic and other copiers increase in speed, and become more automatic, it is increasingly important to provide higher speed yet more reliable and more automatic handling of the original document sheets being copied, i.e. the input to the copier. As discussed herein, the providing of precollation copying, especially with duplex document sheets, greatly complicates and increases the criticality of document sheet handling and protection.

In the description herein the term "sheet" generally refers to conventional flimsy sheets of paper, plastic, or other conventional or typical individual image substrates (original or copy), and not to microfilm or electronic image originals, or semi-rigid image carriers, or cards, which are generally much easier to manipulate. A "simplex" document or copy sheet is one having its page and image on only one side or face of the sheet, whereas a "duplex" document or copy sheet has pages and images on both sides. The present invention is particularly suitable for precollation copying, i.e. multiply automatically recirculated document copying, otherwise known as and "RDH", or recirculating document handling, system, but is also compatible with non-precollation or post-collation copying.

Precollation, or collation, copying, as it is variably called, in a known desirable feature for a copier, which provides a number of important advantages. In precollation copying any desired number of precollated copy sets may be made by making a corresponding number of recirculations of the original document set in collated order past the copier imaging station and copying each document page only once each time it circulates past the imaging station. The copies automatically exit the copier in precollated sets, and thus do not require subsequent sorting or collator. On-line finishing and/or removal of completed copy sets may thus be provided while further copy sets are being made from the subsequent circulations of the same document set.

However, a disadvantage of precollation copying systems is that the documents must all be repeatedly circulated, and copied in a predetermined order, by a number of circulations equivalent to the desired number of copy sets. Thus, increased document handling is necessitated for a precollation copying system, as compared to a post-collation copying system. Therefore, maximizing document handling automation, and minimizing document wear or damage is particularly important in precollation copying.

In contrast, in a post-collation copying system, plural copies are made at one time from each document page and collated by being placed in separate sorter bins. The document set need only be circulated or manually or semi-automatically fed to the imaging station once and multiply copied during that circulation to fill bins of the copy sheet sorter or collator with the corresponding number of copy sets desired. A disadvantage is that the number of copy sets which can be made in one document circulation is limited by the number of available bins. Also, a sorter adds space and complexity and is not well suited for on-line finishing. However, post-collation copying and manual document placement are desirable in certain copying situations to minimize document handling, particularly for highly delicate or irregular documents. Thus, it is desirable that a precollation copying system be compatible with, and alternatively usable for, post-collation copying as well.

Both forward serial order ("1 to N") and reverse order ("N to 1") precollation copying of original documents is known in the recirculating document handler art, for both simplex (one-sided) and duplex (two-sided) original documents and copies. However, in current products and said art, N to 1 (reverse order) document set circulation is conventional for systems feeding from a stack of documents positioned (loaded) over a platen of a copier. In such conventional systems the documents are loaded face-up and fed out from the bottom of the stack and restacked on the top of the stack. The simplex documents are circulated by being turned over, copied, turned over again, and returned back to the top of the stack over the platen.

Such N to 1 document recirculation with continuous bottom feeding and top restacking has been commercially utilized because of a perceived desirability of a "racetrack" or over-platen loop circulation path, in which the documents are recirculated to and from a document stack located over the copier platen, as shown in cited references. Simplex documents are fed in a "loop" from one edge of the stack to the same side or edge of the platen underneath the stack and back from the opposite edge of the platen to the opposite edge of the stack. The documents are stream fed unidirectionally over the platen, i.e. feeding one document on from one side while the prior document is feeding off the other side. The document path has a 180° short path loop turn at each side of the platen. With such a shorter and unidirectional "racetrack" loop path length, document transport speeds can be lower, and sets of only two or three document sheets can be handled without skipped copy cycles more easily than with most non-racetrack systems. Such a known over-platen or "racetrack" ADH system is generally also more horizontally compact than other non-racetrack precollation devices, i.e. takes up less horizontal working space on the top machine surface, as compared, for example, to a known 1-N "Y" configuration document recirculator using a side-by-side document stack feeder and platen transport. A conventional "racetrack" configuration places the document stack support, document feeder, document turn transports or inverters, and platen transport all substantially overlying the platen. Yet by counterbalancing and a pivotal mounting the entire RDH unit may be lifted away from the platen for alternative manual copying.

It is increasingly desirable to provide for automatic and accurate feeding and registration of the individual original document sheets being copied, in order to utilize the higher speed copying capabilities of newer copiers. However, such documents can vary widely in sheet size, weight, thickness, material, condition, humidity, age, and value. The documents may have curls, wrinkles, tears, "dog-ears", cut-outs, overlays, paste-ups, tape, staples, adhesive areas, or other irregularities. Unlike copy sheets, which generally are all from the same batch, cut from the same paper reams, and therefore almost exactly the same size, sets of original document sheets often vary considerably in actual individual size even if they are all of the same "standard"size, (e.g. letter size, legal size, A-4, B-4, etc.) because they have come from different paper batches or have variably changed size with different age or humidity conditions, etc. Yet it is desirable to automatically or semi-automatically feed, register and copy a set of documents with a mixture of sizes, types, and conditions, without document jams or document damage. Further, it is desirable to handle such documents with a relatively compact and inexpensive document handling system. Also, such a document handling system is preferably one which utilizes the existing or conventional external transparent copying window (known as the platen) of the copier, so as to utilize the same existing optics system. To these ends it is also desirable to accurately image the document at the existing or conventional manual registration position on the platen. This allows the automatic or semi-automatic document handling system be readily moved away from the platen area by the copier operator to provide conventional manual placement of documents, including books, on the same copying platen, to be imaged by the same optics.

One of the most important, and difficult to achieve, requirements for automatic handling is the accurate and reliable, but safe, registration of the original document at the proper position for copying. Conventionally the document is desirably automatically either center registered or corner registered (depending on the copier) by the document handler at a pre-set registration position relative to the copier platen, with two orthogonal edges of the document aligned with two registration lines of the copier platen i.e. with the original document aligned with the copier optics and copy sheet registration system. This registration accuracy is desirably consistently within less than 1 millimeter. If the document is not properly registered, then undesirable dark borders and/or edge shadow images may appear on the ensueing copy, or information near an edge of the document may be lost, i.e. not copied onto the copy sheets.

As shown in the cited art, document handling systems have been provided with various document transports to move the original document sheets over the copier platen and into and out of registration. Various combinations of such transports are known with various registration devices or systems. It is known in the art to register the original document for copying at the appropriate position relative to the transparent copying window in various ways. Typically the document sheet is registered by driving it against a gate or stop at one edge of the platen. This may comprise projecting aligned fingers, or roller nips, or a single vertical surface, against which an edge of the sheet is driven into abutment. An important function of such registration is to also de-skew the moving original document, i.e., to properly align it with the registration line as well as to determine and control its registration position.

The type of document transport and registration system used is affected by the type of copier optics, i.e., the copying system. In a constant velocity document transport (CVT) system, in which the document is copied by being moved at a constant velocity over a small (narrow) scanning window of a fixed optics system by its transport, it is generally preferably to preregister the document to its transport just before the document is transported over the copying window, as disclosed in U.S. Pat. No. 3,535,320 issued Oct. 27, 1970 to D. R. Derby.

On the other hand, in most other types of copying systems the document is registered overlying a full sized (full frame) platen. In such systems the document is either scanned while it is held stationary over the platen, or optically stopped by flash illumination through the platen of the entire document as soon as it has been registered. In these full frame systems the document is preferably registered to a fixed pre-set position over the platen glass adjacent one side or edge thereof. As disclosed in U.S. Pat. No. 4,043,665 issued Aug. 23, 1977 to J. R. Caldwell, and U.S. Pat. No. 4,132,401 issued Jan. 2, 1979 to J. F. Gauranski, et al., this can be done by preregistering the document to a transport belt with upstream, off-platen, pre-registration fingers or rollers, and then moving the document a known distance over the platen on the belt into registration, providing there is no slippage during this entire movement between the document and the belt. However, more typically and more desirably it is desired to also provided either fixed or retractable registration fingers, gates or stop edges aligned along one edge of the platen to actually register the document in its copying position without such transport criticality. The document transport can slip briefly relative to a document striking the steop until positive de-skewing and full registration are achieved.

However, many such known recirculating document handlers drive a document onto the platen and register only the lead or trail edge of the document, without precisely side (laterally) registering the document. Any side registrtion of the document that occurs in such systems is performed prior to moving the document onto the platen, and is generally merely that provided by the edge side guides of the document tray, which must be set to accommodate the maximum lateral dimensions of the largest documents in the set. In some other recirculating document systems, a system for also side registering or positioning the document after it is on the platen is used, i.e. positioning of the original on two axes with respect to the desired imaging position on the platen.

This problem of accurately registering an original document on the platen is recognized in the art. Proper registration requires alignment of the document on two orthogonal axes. Various mechanisms have been utilized to corner register a document before it is copied along orthogonal registration positions and in particular, it is known to drive a single (unstacked) document original against edge registration guides using a rotating drive before it is fed to be copied. For example U.S. Pat. No. 4,179,117 issued Dec. 18, 1979 to J. H. Rhodes (IBM) shows an angled drive member which drives a sheet toward side or edge registration as it is being fed to a platen. Likewise U.S. Pat. No. 3,908,986 issued Sept. 30, 1975 to C. D. Bleau (IBM) which has an intermittent such sheet alignment drive. Various other aligners for individual sheets are also well known, e.g. U.S. Pat. No. 4.049,256 issued Sept. 20, 1977 to John Allen Church et al. (IBM).

U.S. Pat. No. 3,630,515 issued Dec. 28, 1971 to L. W. Knapp (Xerox) discloses a recirculating document handling system including a rotating paddle wheel 90 to settle and align document sheets being returned to the top of the stack in the document tray, e.g. Col. 4, lines 31–37.

U.S. Pat. No. 3,476,382 issued Nov. 4, 1969 to J. L. Tregay et al (AMI) discloses adjustable edge guides for a single recirculating document being copied for maintaining lateral alignment thereof through successive copying circulations.

U.S. Pat. Nos. 4,050,688 issued Sept. 27, 1977 to K. K. Stange et al., and 4,130,274 issued Dec. 19, 1978 to K. K. Stange (Xerox) are exemplary of systems for pneumatically corner-registering a document to both edge and end guides directly on the copying platen, and also in a document sheet individual storage means.

Similar systems for so aligning stacks of documents on other sheets are also known, as are similar systems for aligning a sheet on two axes as it is being restacked on top of a stack. However, edge alignment of an original document as it is being restacked does not provide edge alignment of the documents on their first circulation.

U.S. Pat. No. 4,248,413 issued Feb. 3, 1981 to J. Fox (Xerox) shows a stacking and aligning apparatus with a moving belt for two-edge sheet alignment.

U.S. Pat. No. 4,169,674 issued Oct. 2, 1979 to M. J. Russel (Kodak) on a recirculating document handler for precollation copying with document stack bottom feeding and top restacking, discloses, for example, in FIGS. 2 and 3 at reference number 61, and Column 8, lines 13 and 20, a "side jogger" to maintain the document sheets aligned or squared with each other in the stack. A similar document handler, not showing the side jogger 61 but with details of a copier controller interface with the document handler, is taught in U.S. Pat. No. 4,076,408 issued Feb. 28, 1978 to M. G. Ried, et al.

Such mechanical dejoggers for jogging an entire stack by impacting the side of the stack with a moving alignment surface are well known in sheet handling. For example, U.S. Pat. No. 3,627,312 issued Dec. 14, 1971 to G. F. Fackler, et al., shows a side jogger 257, as well as an end jogger 245, for a stack of copy sheets being duplexed. (Col. 6, line 59, et al.).

The use of top restacking and bottom feeding document recirclation aggravates the above-discussed problem of accurate registration of the document being fed. For example, with bottom sheet feeders, since the stack height and weight is variable, the normal force on the bottom sheet, (pressing the stack against the bottom sheet and pressing the bottom sheet against the stack tray) is also variable. Further, even if a document sheet is laterally re-registered as it is being restacked, the agitation of the stack by the bottom feeder, particularly if an air sheet separation system is used, may disturb the initial alignment of the sheet as that sheet works its way down from the top of the stack to the bottom before it is fed out again. Nor can top sheet realignment systems provide any alignment of the sheets fed in the first circulation of a bottom sheet feeder.

Because of the above-discussed variations in the sizes of documents of even the same standard size, it is often not possible to maintain lateral alignment by edge guides or even with edge joggers or tampers. Those sheets in the stack which are undersized can still vary in position by the difference in size between those smaller sheets and the larger sheets in the stack, since the edge guides and/or conventional side joggers are limited in setting by the widest sheets in the stack. Obviously, if edge guides were to be moved in, i.e. set for the smaller sheets, this would not allow flat stacking or settling or unobstructed feeding out of the larger sheets from between these edge guides. Thus, the side guides may have to be set apart by up to a several millimeters greater width than the width of the narrowest sheet in the stack, allowing a corresponding lateral misregistration of such narrower sheets. [As used herein, width or narrowness refers to the sheet dimension transverse its circulative feeding direction, regardless of whether the sheet is fed edgewise (long edge first) or lengthwise (short edge first). The former is more conventional].

Binding of the sheets between edge guides which are too close together, or even forcibly dragging the sheet against one edge guide, can cause wear or damage to the document edges, particularly for the multiple circulations used in precollation copying. Frictional rubbing of documents against only one edge guide, especially over the platen, can also cause skewing of the document as it is being fed. An edge guide on the platen itself has other disadvantages, e.g. potential "show around" printout of a line or shadow on the sides of the copy sheets, or loss of an edge image. Thus, platen edge guides are not generally used, or are withdrawn, in an automatic document feeder. Constant edge tamping or jogging is even worse, because it typically requires repeatedly forceably striking the edges of the stack, usually in only a small and constant area thereof, which can deform or otherwise damage these document edge areas, particularly over the extended time of repeated document recirculations. Older, and/or more brittle documents and extending oversize documents in a set are particularly vulnerable to this damage. In any case, as noted, such edge jogging cannot positively register all of the undersized documents in a set.

In contrast, with the disclosed system herein each bottom sheet in the stack is individually, and gently, but positively, aligned directly against a defined reference lateral edge guide and released before it is fed, regardless of variations in size of the sheets in the stack, i.e. for a wide range of sheet widths, and without any interference of feeding of larger sheets. The sheets are not aligned by hitting their edges. Rather, they are gently pneumatically held by an area of their bottom surface and gently pulled over against the lateral registration edge, but not overdriven. Each document is automatically laterally re-registered each time it is to be fed, i.e. on each circulation of the document set, including the first circulation. By using an RDH which minimizes document sheet skewing in the feeding system from the document set stack to the registration position on the platen no other lateral registration system is needed for the entire RDH system. Thus, there is no significant edge guide drag on the doucments.

Further details of exemplary recirculating document handlers with which the present invention may be utilized, including relevant teachings of such features disclosed in FIGS. 1 and 2 herein, are disclosed in the following pending U.S. patent application all by the same assignee and filed on Oct. 3, 1979. In particular, allowed Ser. No. 81,497 (now U.S. Pat. No. 4,270,746) by Thomas J. Hamlin.

Further details of exemplary methods and systems of recirculation copying using such a document handling system are disclosed in allowed U.S. patent application Ser. No. 71,613 by R. Sahay filed Aug. 31, 1979, now U.S. Pat. No. 4,278,344; and Ser. No. 172,807 filed July 28, 1980 as a continuation of 57,855 filed July 16, 1979 by R. E. Smith, et al., now U.S. Pat. No. 4,330,197 also with the same assignee.

Pneumatic sheet transport devices per se, are of course, well known. For example, in addition to some of the above art, U.S. Pat. No. 3,499,710 issued Mar. 10, 1970 to L. W. Sahley (Re. No. 27,976) discloses in FIG. 13 and Col. 19 for example, suction members 290 for transporting a document to be copied. U.S. Pat. No. 3,973,768 issued Aug. 10, 1976 to R. E. Shannon discloses a movable platform with a suction cavity portion for gripping an article to be printed. Numerous other moving pneumatic member sheet feeders are known.

The above-cited and other patents and applications are incorporated by reference herein to the extent of their relevance for additional or alternative details and background.

A preferred specific feature of the invention is to provide, as disclosed hereinbelow, an apparatus for and a document handling method for plurally recirculating a set of document sheets for precollated copying wherein the document sheets are repeatedly individually fed seriatim from the bottom of an overlying stack thereof for copying with registration and returned to the top of the stack for restacking, the improvement comprising the steps of:

individually acquiring, and indivdually urging laterally into contact with a lateral registration edge, each document sheet when it is the bottom sheet of the stack of document sheets, releasing said bottom sheet, and feeding said bottom sheet out from said stack transverse said lateral registration edge by separate sheet feeding means only after it has been so laterally registered and released.

Further preferred features are to provide said individual lateral registration of the bottom sheet in the stack by simultaneously blowing air at said stack from at least one edge thereof to aid said relative movement between said bottom sheet and the overlying sheets in said stack.

As further features, said individual acquiring of said bottom document sheet may be accomplished by applying a vacuum to an area of the bottom surface of said bottom document sheet adjacent said lateral registration edge through a movable vacuum member, and said movable vacuum member is gently pulled towards said lateral registration edge while continuously applying said vacuum and without substantial slippage between said vacuum member and said bottom sheet to pull said bottom-most document sheet towards said lateral registration edge.

Further features and advantages of the invention will be better understood by reference to the following description, and to the drawings forming a part thereof, wherein.

Figure 2:
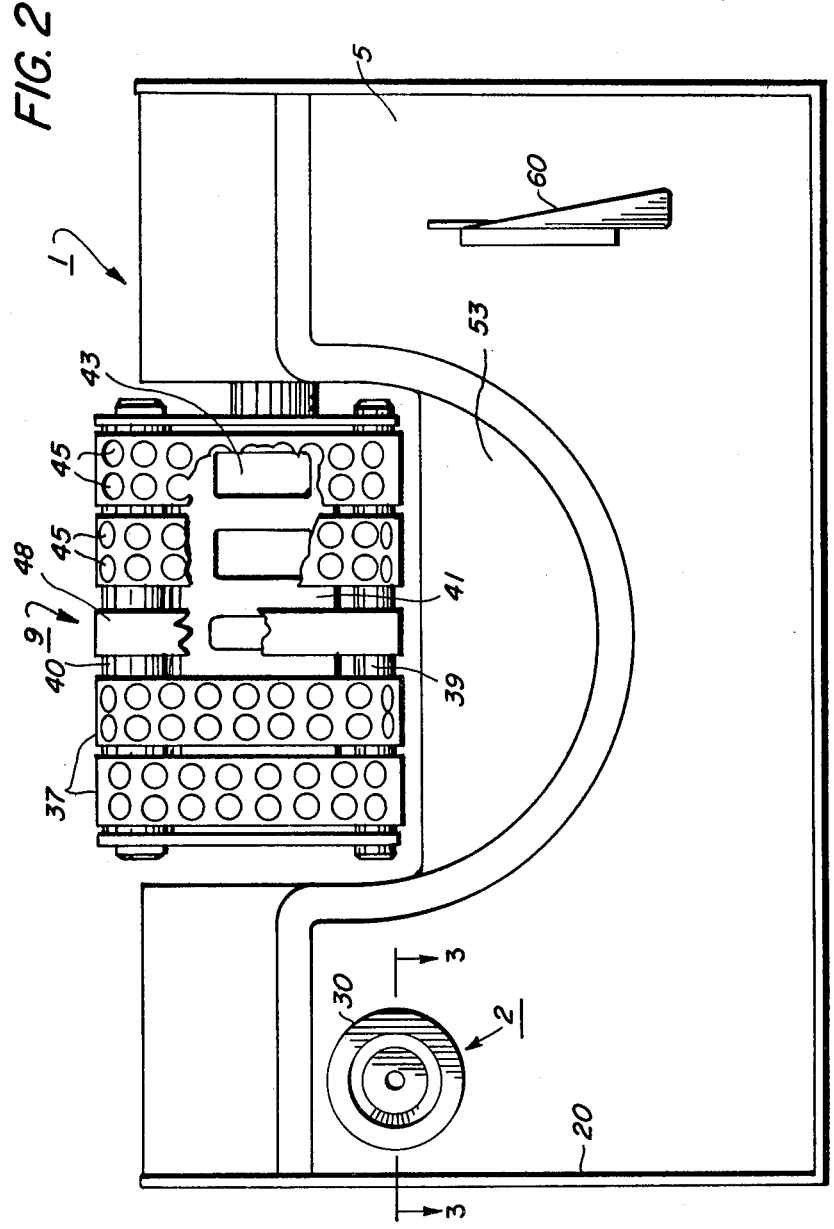
FIG. 2 is a plan view of the document handler of FIG. 1.

Referring particularly to FIG. 2, there is illustrated an exemplary automatic document handler 1 for installation over the exposure platen 3 of a conventional xerographic reproduction machine. This is merely one example of a document handler with which the exemplary lateral document registration system 2 may be combined. The document handler 1 is provided with a document tray 5 adapted for supporting a stacked set of documents 7. A vacuum belt corrugating feeder mechanism 9 is located below the front or forward area of the document tray for acquiring and corrugating the bottom document sheet in the stack and for feeding out that document sheet to a take-away roll pair 11 after an air knife 12 has had time to help separate that bottom sheet from the rest of the stack. That document is then fed by the take-away roll pair 11 through document guides 13 to a feed-roll pair 15 and under platen roll 17 onto the platen of the copy machine for reproduction. A retractable registration edge 18 is provided here to register the lead edge of the document fed onto the platen. Following exposure of the document, the edge 18 is retracted by suitable means such as a solenoid and that document is fed off the platen by roll 17 into guide 19 and feed-roll pair 21 and returned back to the top of the document stack 7 through a feed-roll pair 23. Gross restacking lateral realginemtn is provided by an edge guide 60 resettable to a standard sheet size distance from an opposing fixed edge guide 20. The "wing" on the guide 60 helps settle incoming (restacking) sheets between the two guides 20 and 60.

In the event it is desired to present the opposite side of a document for exposure, the document is fed from the stack 7 through guides 13 until the trail edge passes document diverter 24. Document diverter 24 is then rotated counterclockwise, i.e. into the document sheet path. The document direction is reversed and the document is diverted by divertor 24 through guides 26 and feed-roll pair 28 onto the platen 3.

The document handler 1 is also provided with a sheet separator finger 35 as is well known in the art, to sense and indicate the documents to be fed versus those documents returned to the document handler, i.e. to count each set circulation. Upon removal (feed out) of the last document from beneath sheet separator finger 35, the finger 35 drops through a slot provided in the tray 5 to actuate a suitable sensor indicating that the last document in the set has been removed from the tray. The finger 35 is then automatically rotated in a clockwise direction or otherwise lifted to again come to rest on top of all the documents in the stack 7, for the start of the next circulation of the document set 7.

Referring more particularly to FIG. 2, and the document sheet separator-feeder 9, there are disclosed here a plurality of feed belts 37 supported for movement on feed belt rolls 39 and 40. Spaced within the run of the belts 37 there is provided a vacuum plenum 41 having openings 43 therein adpated for cooperation with perforations 45 in the belts 37 to provide a vacuum for pulling the bottom document in the document stack onto the belts 37. The plenum 41 is provided with a raised portion beneath the center belt 48 run so that upon capture of the bottom document in the stack against belts 37, a center corrugation will be produced in the bottom sheet. This raised portion may project above the plane of the remainder of the belts by approximately 3 millimeters. Note also that the belts are preferably below the surrounding support surfaces. Thus the document is corrugated into a double valley configuration. The flat surfaces of the vacuum belts 37 on each side of the raised center belt 48 generates a region of stress on the document which varies with the document beam strength. In the unlikely event that more than one document is pulled down into contact with the vacuum feed belts, the beam strength of the second (overlying) document resists this corrugating action. Thus, gaps are opened between the first and second sheets, which gaps extend to the sheet lead edges. These gaps or channels reduce the vacuum pressure levels between these sheets due to porosity in the first (bottom) sheet and provide for entry of the separating air flow from the air knife 12.

The air knife 12 is comprised of a pressurized air plenum 50 having a plurality of separated air jet openings or orifices 51 to inject air between the bottom-most document pulled down against the feed belts and the documents thereabove to provide an air cushion or bearing between the stack and the bottom document to minimize the force needed for removing the bottom document from the stack, and here also for minimizing the lateral force on the bottom sheet needed to move it laterally into lateral registration.

With the use of this air knife in conjunction with the above-described bottom sheet corrugator, even if two documents are pulled down toward the belts 37, since the top sheet would not be as corrugated, the air knife would inject air into the space between the two documents and force the second document off from the raised belt back toward the document stack.

Figure 1:
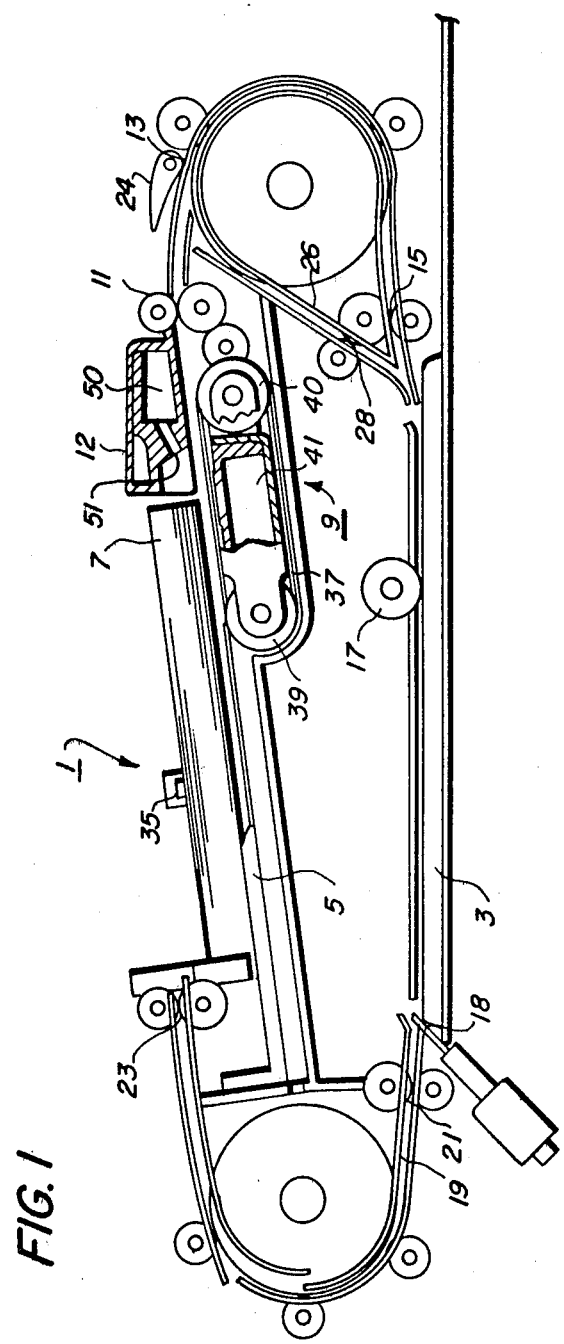
FIG. 1 is a cross-sectional side view of an exemplary recirculating document handler for employing the document sheet lateral edge registration system of the present invention.

As can be seen by reference to FIG. 2, the stack tray is designed such that the lead edge of the sheets in the stack are spaced a slight distance from the front edge of the tray. Further, the air knife is canted as shown in FIG. 1 such that the air streams are discharged at an angle to the plane of the surface of the belts. With this disclosed interrelationship between the vacuum feed belts, the lead edge of the stack of sheets, and the air knife location and angular orientation, the document feeder is capable of reliably separating and feeding individual document sheets even if the sheets have some up-curl.

By suitable valving and controls, it is also desirable to provide a delay between the time the vacuum is applied to pull the document onto the feed belts and the start up of the feed belts, to assure that the bottom document is captured on the belts before belt movement commences and to allow time for the air knife to separate the bottom sheet from any sheets that were pulled down with it.

By reference particularly to FIG. 2, it can be seen that the document tray 5 is provided with a depressed portion or pocket 53, lower than the rest of tray 5, behind the feed belt assembly. This pocket 53 serves a number of purposes. First, space is provided for the forward portion of the bottom document to be pulled down onto the feed belt assembly, providing for formation of the two valley corrugation previously mentioned. Secondly, the vacuum is applied over the area of the pocket with an air seal between the bottom document provided by the edge of the pocket. The air seal maximizes the vacuum force over the whole area of the pocket, thus helping to pull the bottom document onto the feed belt assembly. A third function of the pocket 53 is to provide for a high pressure seal between the bottom sheet and the remainder of the stack. This high pressure seal is achieved by supporting a major portion of the stack weight in the edge regions of the pocket. The seal serves to reliably convert the velocity energy of the air knife flow into a lifting pressure over the pocket area.

To further increase the efficiency of the system, the stack tray is provided with a rearward tilt as shown in FIG. 1. When flotation air is provided under the stack or between the first and second sheets, gravity will allow the sheets to settle or float back against the rear tray wall. Thus, the sheet being removed is pulled uphill while gravity helps hold the remainder of the sheets back, helping to prevent multifeeds, and providing alignment or initial end registration of the stack 7 on one axis (in the feeding direction).

With this disclosed arrangement of pocket geometry, air knife and spaced, corrugating, feed belt assembly, optimum document separation and feed can be obtained without the necessity for retard members or multiple sheet stops. Further, the system is extremely gentle, and since the feed belts are not actuated until the document is firmly captured thereon, there is a minimal slippage between the document and the feed belts and therefore smear or document degradation is practically non-existent.

Figure 3:
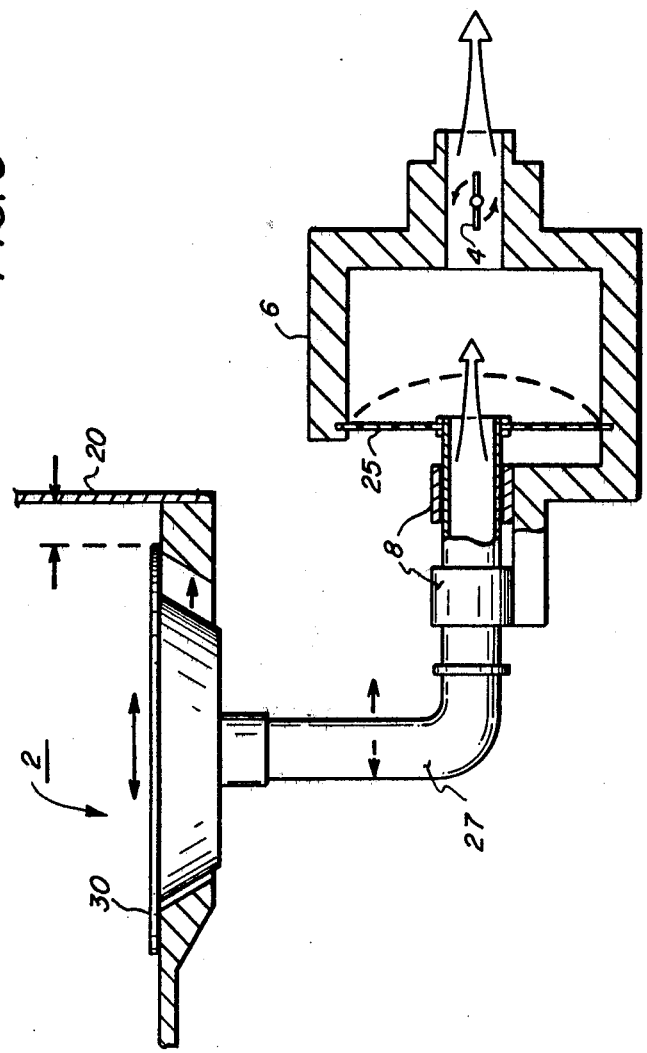
FIG. 3 is an enlarged and partially cross-sectional view taken along the lines 3—3 of FIG. 2 illustrating an exemplary lateral document sheet registration system in accordance with the present invention.

Referring now particularly to FIG. 3, but also to FIG. 2, there is disclosed an embodiment of the automatic bottom document sheet lateral registration system 2 of the invention. Each bottom sheet in the bottom sheet feeding tray 5, i.e. the document being fed from the document tray 5 in the recirculating document handler 1, is automatically deskewed and side registered before being fed out of the tray by being gently pulled against a stationary side guide 20 of the tray and then released. This is provided here by a pneumatic system in which the bottom sheet is pulled by a light weight, low force pre-loaded movable suction member 30 (e.g., here a small cup) which is slidably mounted in the tray 5 bottom surface near the desired registration side guide 20. A vacuum, which may be from the existing vacuum source for manifold 41, is periodically automatically applied through a valve 4 to provide the vacuum for the suction cup 30 to engage the sheet and also to laterally move the suction cup 30 towards side 20 by the same vacuum source being applied to a flexible diaphragm 25 which pulls the suction cup 30 in the desired direction. A spring loading (by diaphragm 25 and/or an external spring) prevents motion of this assembly until a sheet is acquired by the suction cup. The acquired sheet blocks the air flow through combined air conduit and connecting arm 27 and allows the vacuum level in manifold 6 to increase so that the vacuum force in fixed manifold 6 acting on flexible diaphragm 25 overcomes the spring force thereof. This arrangement automatically and correctly sequences the required actions.

The valve 4 is opened and closed by a solenoid actuated by the conventional programmed copier controller, as are the other active air and drive components, as descirbed in the above-incorporated cited art. Alternatively, simple conventional time delays can be used. As noted, the valve 4 is opened to apply vacuum as, or slightly after, air pressure is applied to the air knife, and a fixed brief time delay interval before vacuum is applied to the feed belt manifolds, and then there is another fixed brief time delay before the start-up of the feed belts, during which the valve 4 is closed to remove all engagement with the bottom sheet by the registration system 2. As noted, the latter delays and controls therfor are taught in the art. Also, they are commerically known to the art in the Zerox Corporation"5600" copier.

As an alternative, the lateral movement of the vaccum shoe 30 can be by activating an electrical solenoid, preferably connecting through a spring to reduce its maximum force acting on the sheet.

As another alterntive, the suction cup 30 could be replaced by a small vacuum belt with a low force drive.

With this system 2, each document sheet, regardless of variations in its initial spacing (misregistration) from side guide 20, is pulled laterally but gently toward the wall 20. Once that edge of the document contacts the wall 20 the limited force of the system and the built-in flexibility and spring loading prevents further motion of the vacuum shoe or cup 30, i.e. the sheet cannot be overdriven against the wall 20 to damage its edge. This may be assisted, for example, by making the connecting arm 27 deflectable and limiting with stops 8 the maximum movement of arm 27 at the diaphragm 25 end thereof. Also the valve 4 is closed to remove the vacuum after a brief time period and before the sheet is to be fed out.

Meanwhile, the air knife system 12 described above is providing an important and cooperative function. It is providing separation and air lubrication between the bottom sheet being so reregistered and the overlying sheets in the stack and between the bottom sheet and the tray 5, thereby greatly reducing the force needed for lateral registration by the system 2.

With the lateral registration system 2, no other lateral registration system is required. That is, with a low skew document feeder, as disclosed herein, no lateral re-registration is required over the platen or anywhere else in the entire document recirculation system.

While the recirculative document sheet lateral registration and feeding system disclosed herein is preferred, it will be appreciated that various other alternatives, modifications, variations or improvements thereon may be made by those skilled in the art, and the following claims are intended to encompass all of those falling within the true spirit and scope of the invention.

I claim:

1. In a recirculating document handling apparatus for repeatedly recirculating a set of plural flimsy document sheets for precollation copying wherein the document sheets are repeatedly individually fed seriatim from the bottom of a stack thereof for copying in a precise registration position on two axes on a copier platen, in the direction of document movement and laterally thereof, and then returned to the top of the stack and restacked between two elongated lateral edge guides, said two edge guides being laterally spaced by a greater distance than the lateral dimensions of said document sheets to allow unrestricted restacking therbetween with variations in document dimensions, and one of said edge guides being stationarily aligned with said lateral registration position on said platen but spaced therefrom, and the other edge guide being repositionable for different sizes of documents, the improvement in maintaining said lateral registration of each document sheet in the platen registration position comprising:

lateral registration means underlying the stack for individually acquiring each document sheet when it is the bottom sheet of the stack of document sheet and individually urging said bottom sheet laterally gently into contact with said stationary one of said two restacking lateral edge guides with automatic force limiting means to laterally register said bottom sheet, means for blowing air between said bottom sheet and said stack of sheets to enable the lateral movement of said bottom sheet by said lateral registration means relative to said stack of sheets, said lateral registration means automatically releasing said bottom sheet after it is so laterally registered, and non-skewing feeding means for feeding said bottom sheet out from said stack to said platen maintaining alignment with said one lateral edge guide, after the bottom sheet has been laterally registered and relased by said lateral registration means, so as to provide lateral registration of the sheet on the platen for said copying registration without over-platen lateral registration means.

2. The apparatus of claim 1 wherein said lateral registration means comprises a movable vacuum member with means for moving said movable vacuum member towards said one lateral edge guide while applying a vacuum thereto and without substantial slippage between said vacuum member and said bottom sheet to pull said bottom sheet into abutting alignment with said lateral edge guide.

* * * * *